Figure 1:
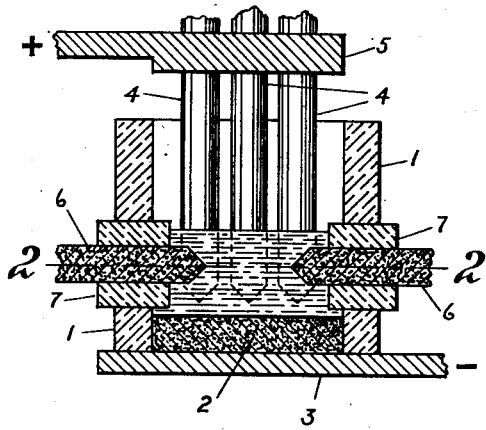

March 15, 1932.  H. K. McINTYRE ET AL  1,849,749

ELECTRIC FURNACE

Filed Sept. 4, 1924

WITNESSES:

INVENTORS:

Patented Mar. 15, 1932

1,849,749

UNITED STATES PATENT OFFICE

HENRY KNOX McINTYRE AND GEORGE CHANDLER COX, OF RALEIGH, NORTH CAROLINA; EDNA MOORE McINTYRE, JOHN G. McINTYRE, AND MALCOLM McINTYRE EXECUTORS OF THE ESTATE OF HENRY KNOX McINTYRE, DECEASED

ELECTRIC FURNACE

Application filed September 4, 1924. Serial No. 735,833.

In the electrolytic reduction of metals from their ores in fused electrolytes, there are two conditions which must be considered. First: there is a certain electro-motive-force which must be applied between the electrodes in order to bring about the desired reduction. This electro-motive-force varies with the different metals. In addition, there is a certain optimum temperature which must be maintained in the electrolyte in order to bring about the desired electrolytic action.

In such furnaces as carry out such electrolytic action, a part of the energy supplied goes to reduce the metal from its ore while another part maintains the desired optimum temperature which the conditions require.

In the furnaces in common use to carry out such reduction of metal as in the well known electric furnace for the reduction of aluminum, the energy for both the carrying on of the electrolysis and the maintenance of the optimum temperature is supplied by direct current and through a single set of electrodes. Because of the fact that for example, it is sometimes desirable to change the electrolytic action by altering the electro-motive-force, without changing the optimum temperature, or to change the optimum temperature without altering the electrolytic action, difficulty is met in the control of the one without causing a corresponding but undesirable change in the other.

The primary object of our invention is the production of a furnace in which the two functions of the electrical energy supplied is separated and subject to approximately independent control. Of course, energy for electrolysis must be supplied by direct current, but the energy required for heating may be supplied in several different ways, among which may be mentioned fuel and alternating current, either supplied through supplementary arc or resistance circuits or by applying the principle of the well known induction furnace.

The advantages gained by such separation of the two functions of the energy supplied are many: By using a set of electrodes only for electrolysis, the electrodes are relieved of of a large part of the duty imposed upon them, as a result, the temperature of these electrodes may be kept lower, thus the deteriorating action of any products liberated at the electrodes which affects the electrodes is lessened. The temperature of such furnace may be raised higher than would be otherwise permissible and very refractory materials may be electrolyzed more successfully. We have in mind a nickel reducing furnace which was used for the reduction of nickel from a silicate ore described in the transactions of the American Electrochemical Society, XX, 1911, page 315. In this nickel process direct current was used and an alloy of nickel silicon was obtained. Much trouble was experienced with the electrodes and the process was abandoned largely for this reason. We cite this type of furnace as an illustration of the present state of the art, in which for example we propose to overcome some of the difficulties encountered in this type of furnace by supplying part of the heat energy by means separate from the direct current electrodes, such as by introducing alternating current electrodes. We thus attain a higher or controlled temperature without overburdening the direct current electrodes.

By applying separately the two functions of the energy, we make it possible to adjust the temperature to the optimum for any given process and at this optimum temperature we may thus apply a direct electro-motive-force suitable for the separation of any desired metal or product, without separating metals or products which have a higher decomposition electro-motive-force. Again by raising the electrolyzing electro-motive-force in successive furnace stages, we may effect a group separation of metals or products.

As a further proof of the value of the separate supply of the two functions of the energy previously mentioned, comparison was made on the extraction of aluminum by the usual single current method and by the double current method. In these comparisons, the control effected by the double current furnace required less attendance, and less difficulty in keeping the temperature at its optimum value and less trouble from clogging than the single current furnace. The greater ease of control was strikingly shown by comparison of the recording ammeter charts taken during the test runs.

Figure 3:
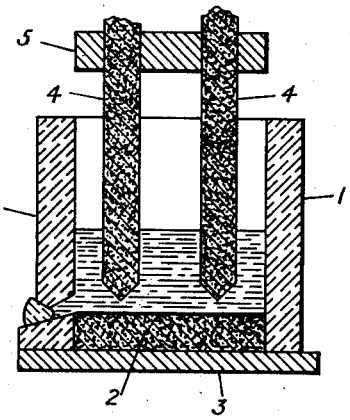
Figure 2:
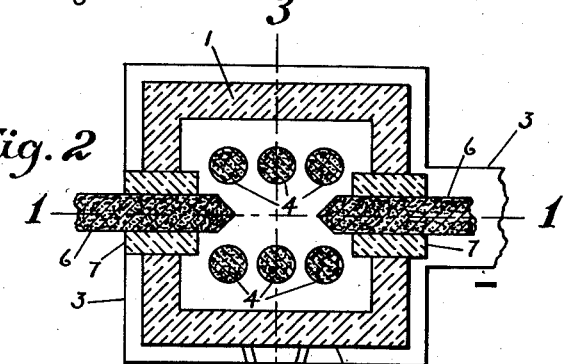

This combination furnace has a wide application in the treatment of ores: for example, we very successfully separated metallic copper from its oxide dissolved in cryolite ($AlF_3 3NaF$) and believe that the supplementary electrodes as shown in Figure 1 to Figure 3 very materially aided in this separation.

Drawings of the double current furnace above referred to are as shown in Figure 1 to Figure 5 inclusive. We do not wish to confine ourselves to the details as shown, but rather as an illustration of the principles hereinbefore discussed.

The furnace may be constructed in a number of ways using single or polyphase alternating current, direct current, or fuel for heating, however, for the sake of clearness we illustrate in Figures 1 to 5 two types of rectangular electrolytic furnace in which single phase alternating current is used to supply the heat energy required to keep the electrolyte in a molten state or to regulate the temperature to the optimum required for the process. Preferably the flow of alternating current through the furnace should be in a plane or planes approximately at right angles to the flow of direct current required for the electrolytic separation.

Figure 4:
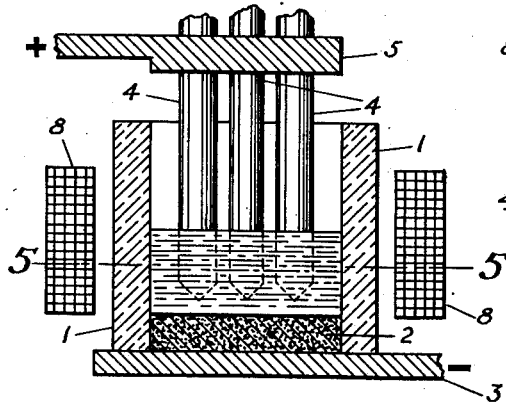

In the accompanying drawings, Figure 1 is a vertical section of the furnace; Fig. 2 is a plan view of the furnace along the line 2—2, Fig. 1; Fig. 3 is a vertical section along the line 3—3, Fig. 2, showing the proximity of the direct current electrodes to the negative carbon bottom of the furnace; Fig. 4 is a vertical section of a combination electrolytic furnace using a single phase induction winding to supply and control the heat energy; and Fig. 5 is a plan of the combination induction furnace along the line 5—5, Fig. 4.

Similar numerals refer to similar parts throughout the several views.

A refractory crucible 1, having a carbon or graphite bottom 2, supported on and electrically connected to the furnace base 3, constitutes the furnace chamber. Direct current for electrolytic separation is supplied through carbon or graphite electrodes 4, held in an adjustable electrode holder 5, and the carbon or graphite bottom 2. As it is desired that the material which is electrolytically separated be concentrated at the bottom of the furnace, the base 3, is made the cathode or negative terminal and the adjustable holder 5, is made the anode or positive terminal of the direct current supply. Incidentally the direct current furnishes a small amount of the heat energy proportional to the distance between the movable electrodes 4, and the carbon or graphite bottom 2.

Figure 5:
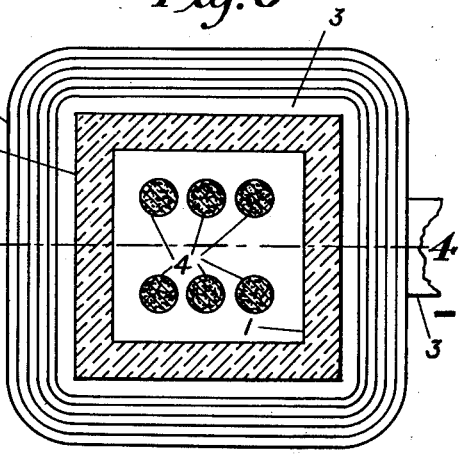

The remainder of the heat energy required to keep the electrolyte in the molten state or to regulate the temperature to the optimum required for the process may be supplied directly to the furnace as shown in Figures 1 to 3, by means of alternating current electrodes 6, introduced into the refractory crucible through electrode guides 7, or by means of an induction winding 8, Figures 4 and 5, or by means of fuel, or by a combination of two or more of the above methods.

The advantage of any of these types of furnace is that separate control of energy supplied for electrolysis and for heating is effected.

We, therefore, claim as new and original improvements in a combination electric furnace the following:

An electrolytic furnace comprising direct current electrodes for carrying the electrolytic electro-motive-force and means for conducting energy to provide heat in the furnace for maintaining the optimum temperature, said energy conducting means including alternating current electrodes and an alternating current induction heating device having its core axis passing through the electrolyte.

HENRY KNOX McINTYRE.
GEORGE CHANDLER COX.